Feb. 10, 1970
S. O. SHIFFER
3,494,303
FOOD PROCESSING SYSTEM
Filed April 25, 1968
3 Sheets-Sheet 3
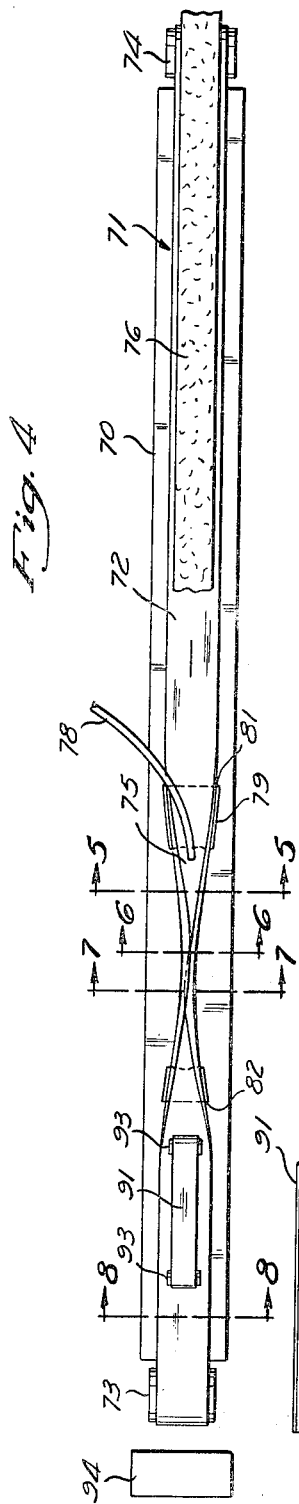
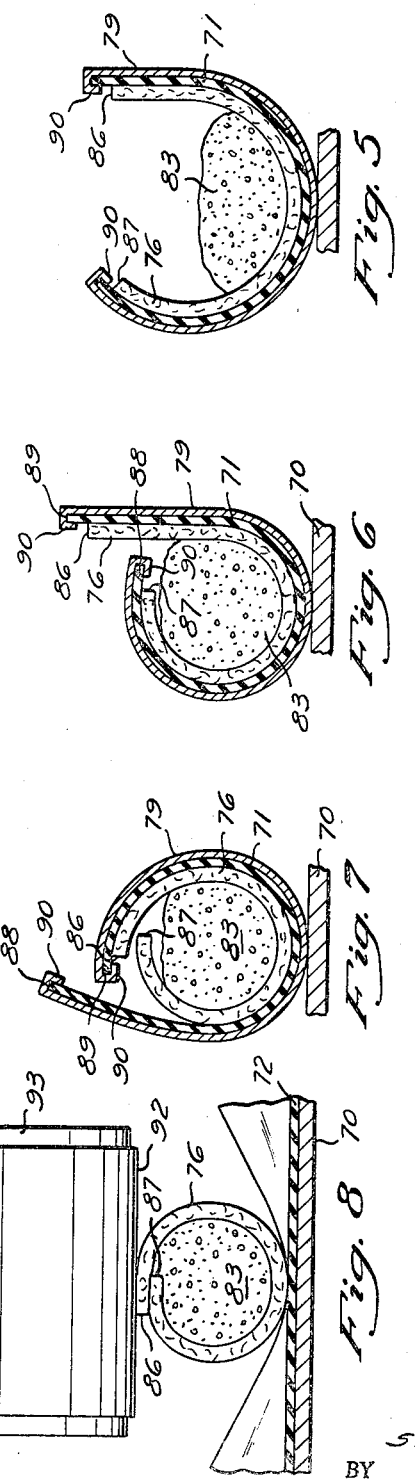
INVENTOR.
STUART O. SHIFFER
BY
McNENNY, FARRINGTON, PEARNE, & GORDON
ATTORNEYS United States Patent Office 3,494,303
Patented Feb. 10, 1970

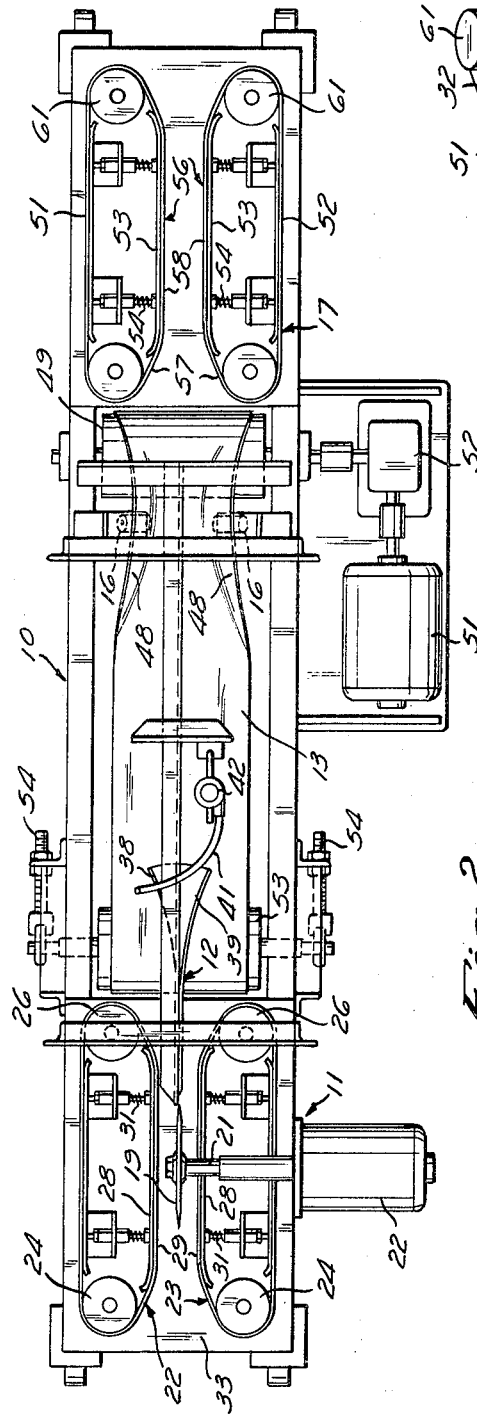

3,494,303
FOOD PROCESSING SYSTEM
Stuart O. Shiffer, % Shiffer Industrial Equipment, Inc.,
9900 Royalton Road, North Royalton, Ohio 44133
Filed Apr. 25, 1968, Ser. No. 724,102
Int. Cl. A23g 3/00
U.S. Cl. 107—1                                   10 Claims

ABSTRACT OF THE DISCLOSURE

Two food processing machines are disclosed, one for making garlic bread and the other for making egg rolls. Both machines include a belt conveyor to carry encasing material past a filling position where a filling material is automatically metered onto the encasing material. The belt is subsequently deformed by guides to initiate closing of the encasing material around the filling. Final closing is provided by pressing the encasing material between two belts. The garlic bread machine also includes a cutter and spreader operable to automatically cut loaves of bread lengthwise and spread the two halves on the conveyor.

BACKGROUND OF INVENTION

This invention relates generally to food processing machinery and more particularly to novel and improved machines for the automated manufacture of food products which include an encasing material and a filling material such as garlic bread, egg rolls, and the like.

Machines incorporating the present invention may be used for the automated manufacture of food products which include a filling material or spread enclosed within an encasing material. The illustrated embodiments are arranged to make garlic bread or egg rolls. However, the principles of this invention may be applied to make other food products of similar general types.

PRIOR ART

In the past it has been customary to make garlic bread by manually cutting the bread, spreading the garlic butter on the bread and then reclosing the bread. Similarly, egg rolls have customarily been made by manually assembling the filling and the dough and manually shaping the finished product. The use of hand labor to manufacture such food products greatly increases the cost, reduces uniformity, and increases the likelihood of the presence of dirt, germs, and other contaminants.

SUMMARY OF INVENTION

In accordance with the broader aspects of this invention an encasing material such as bread or egg roll dough is positioned on a belt conveyor which carries it past a filling position. A filling material such as garlic butter or egg roll filling is metered onto the casing material as it passes the filling position. The conveyor then passes guide means which cause the edges of the belt of the conveyor to raise and initiate closing of the encasing material. Final closing is accomplished by pressing the encasing material between two opposed belts.

A garlic bread machine or the like also preferably includes a cutter and spreader which automatically cuts a loaf lengthwise into two halves joined at one edge and spreads the two halves out on the belt conveyor in position to receive the garlic butter filling. Sensing means control the supply of the filling material so that a measured amount of filling is applied to the bread only when the bread is properly positioned to receive such filling material.

The preferred embodiment of an egg roll machine incorporating this invention operates to supply a continuous strip of egg roll dough to the filling position and to continuously deposit the filling material on the dough as it passes the filling position. Therefore, the machine first forms a continuous length of egg roll which then passes through a cutter operable to cut the egg roll into uniform lengths as the finished product.

Since machines incorporating this invention operate automatically, cleanliness can be achieved and maintained without difficulty. Similarly, uniformity of the finished product is improved since a manual combination of the ingredients is eliminated. Finally, lower costs are achieved because the labor involved in the manufacture of the product is substantially eliminated.

OBJECTS OF INVENTION

It is an important object of this invention to provide a novel and improved food processing machine suitable for the manufacture of food products such as garlic bread, egg rolls, and the like.

Other objects and advantages will appear from the following description and drawings wherein:

FIGURE 2 is a plan view of the machine illustrated in FIGURE 1;

FIGURE 3 is a schematic perspective view of the machine of FIGURES 1 and 2 illustrating the functional operation thereof;

FIGURE 4 is a schematic plan view of an egg roll machine incorporating this invention;

FIGURE 5 is an enlarged fragmentary section taken along 5—5 of FIGURE 4;

FIGURE 6 is an enlarged fragmentary section taken along 6—6 of FIGURE 4;

FIGURE 7 is an enlarged fragmentary section taken along 7—7 of FIGURE 4; and,

FIGURE 8 is an enlarged fragmentary section taken along 8—8 of FIGURE 4.

Figure 1:
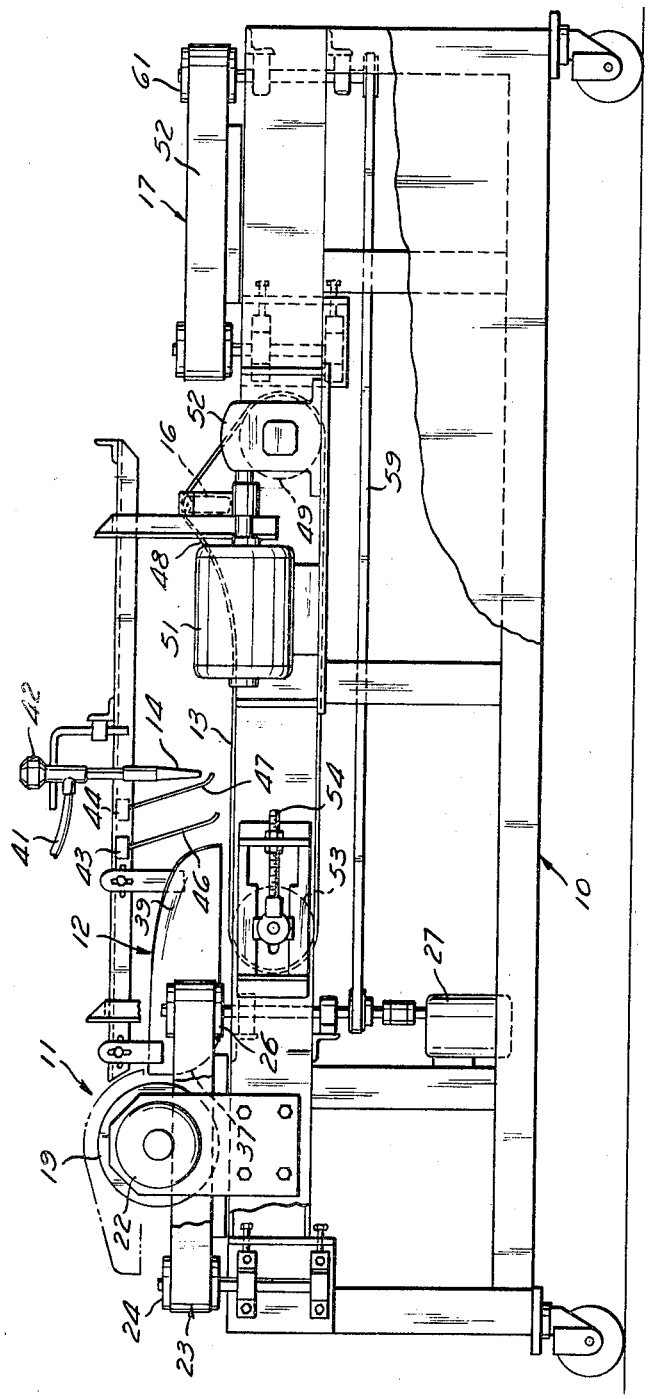
FIGURE 1 is a side elevation of a garlic bread manufacturing machine incorporating this invention.

Referring to FIGURES 1 through 3, a garlic machine incorporating the present invention includes a frame 10 which supports the functioning subassemblies of the machine. A cutter assembly 11 is mounted on the frame 10 adjacent to one end. Positioned adjacent to the cutter assembly 11 is a spreader 12 which spreads the cut loaves of bread on the end of a belt conveyor 13. The belt conveyor 13 carries the loaves past a filling position at a nozzle 14 through which garlic butter or the like is pumped onto the loaves.

Beyond the nozzle 14 are inclined guide rollers 16 which operate to deform the belt 13 into a generally V-shaped condition wherein the lateral edges of the belt 13 are raised above the center portion thereof. As is described in more detail below, this causes the initiation of the closing operation. Located beyond the guide rollers 16 is a closing belt conveyor assembly 17 which completes the closing of the loaf by pressing the two halves together. The finished product is discharged from the right end of the machine (as viewed in the drawings).

The cutter assembly 11 includes a circular cutter blade 19 mounted on the output shaft 21 of a cutter drive motor 22. The blade 19 is positioned centrally between a pair of similar, but opposite, cutter feed belts 22 and 23. Each of the cutter feed belts passes over an associated idler pulley 24 and a drive pulley 26 all of which are journaled for rotation about vertical axes. The drive pulleys 26 are driven at the same speed in opposite directions by a cross-over connecting belt (not illustrated) and a conveyor drive motor 27. Similar, but opposite, guides 28 are positioned behind the adjacent opposed reaches 29 of the two conveyors 22 and 23 to tension the belts and resiliently maintain the two reaches 29 substantially parallel on opposite sides of the cutter blade 19. Springs 31 provide the resilient force urging the guides 28 toward each other.

When the machine is operated, a loaf of bread 32 (illustrated in FIGURE 3) is fed lengthwise into the cutter along a support table 33 positiond below the belt conveyors 22 and 23. The two opposed reaches 29 of the belts engage opposite sides of the loaf to guide the loaf 32 and feed it past the cutter blade 19 which cuts the loaf into two lengthwise halves 34 and 36. The lower edge of the blade 19 is spaced above the support table 33 so that the loaf 32 is not cut completely through and the two halves are joined along their lower edges at 37.

The belt conveyors 22 and 23 also carry the cut loaf forward to the spreader 12 and onto the end of the conveyor belt 13. The spreader 12 is formed with a sharp edge at 37, aligned with the blade 19, which enters the lengthwise cut of the loaf. The spreader is also provided with diverging side walls 38 and 39 which are joined at their bottom and diverge along their upper edge so that the two halves 34 and 36 are spread open on the conveyor belt 13, as illustrated in FIGURE 3, before the loaf reaches the filling position below the nozzle 14.

In the illustrated embodiment the nozzle 14 is positioned over only the half 36 so that garlic butter is deposited only on the half 36 of the loaf as it passes the filling position. The garlic butter is preferably supplied to the nozzle 14 by a pump (not illustrated) through a pressure line 41 and a solenoid valve 42. A pair of sensing switches 43 and 44 (illustrated in FIGURE 1) are connected in series to control the operation of the valve 42. The switches 43 and 44 are provided with operating arms 46 and 47, respectively.

The two sensing switches 43 and 44 are connected so that both switches must close before they operate to open the solenoid valve 42. Therefore, as a loaf 32 is carried by the belt toward the nozzle 14, its operation of the sensing arm 46 to close the switch 43 does not operate to open the valve 42 until the sensing arm 47 is engaged and closes the switch 44. The sensing arm 47 is positioned so that it closes the switch 44 only when the leading edge of the loaf 32 is beneath the nozzle. The valve 42 remains open as the loaf passes below the nozzle until the rearward edge of the loaf moves out of contact with the sensing arm 46 which is positioned ahead of the nozzle 14. As soon as the switch 43 opens, the valve 42 closes. Shutting the valve 42 before the rearward edge of the loaf reaches the position at the nozzle insures that the last dripping of butter will stop before the rearward edge of the loaf moves past the nozzle and insures that the butter will be deposited only on the loaf and not on the belt 13. Preferably the temperature of the butter is controlled so that the butter has a soft paste-like consistency.

The conveyor belt 13 is formed of a relatively thin elastomeric material so that it can smoothly deform upwardly along its lateral edges at 48 as it approaches the inclined rollers 16. A thin neoprene belt formed with a relatively rough upper surface has been found to function satisfactorily. The belt 13 is driven by a drive pulley 49 powered by a motor 51 through a gear box 52. A tensioning idler roll 53 is located at the other end of the belt 13 and is axially adjustable relative to the frame 10 by tension adjustment means 54. The two rollers 16 are preferably mounted for rotation about axes which extend upwardly from the horizontal at an angle of at least about 45° and are positioned with respect to each other so that the belt is deformed to a V-shape as it passes the rollers 16. The guide rollers 16, therefore, cause the belt 13 to initiate the closing of the two halves 34 and 36 of the loaf after it leaves the filling position. Preferably the various elements are proportioned so that the initiation of the closing movement does not occur until the rearward edge of the loaf passes beyond the nozzle 14 so that the uniformity of the distribution of the butter is not affected by closing movement.

The final closing of the loaf is provided by opposed closing belts 51 and 52. These belts and their supports are generally similar to the belt conveyors 22 and 23. Tensioning guides 53 are resiliently urged by springs 54 against the back side of the adjacent reaches 56 of the belts 51 and 52. The adjacent reaches provide converging portions 57 and substantially parallel opposed portions 58. The converging portions 57 engage the partially closed end of the loaf leaving the belt 13 and complete the closing of the loaf as the loaf passes through the area between the belts 51 and 52. The closing belts 51 and 52 are located sufficiently close to the guide rollers so that the forward end of the loaf engages the closing belts before the rearward end leaves the V-shaped section of the belt 13. This prevents the loaf from falling open before it reaches the closing belts.

The two belts 51 and 52 are driven by the motor 27 through a drive belt 59 illustrated in FIGURE 1 and a cross-over connecting belt (not illustrated) which connects the two drive pulleys 61 for rotation in opposite directions at equal speed. Since the garlic butter spread on the half 36 is relatively pastey in consistency, the closing of the two halves causes a portion of the garlic butter to be transferred to the half 34 and also tends to hold the loaf in the closed position so that it may be packaged and handled with ease. Preferably the drive motors 27 and 51 are arranged so that the surface speed of all of the belts is substantially equal.

Referring now to FIGURES 4 through 8, an egg roll machine incorporating this invention is again provided with a thin elastic belt 71 which is provided with an upper reach 72 extending along a table 70 between a drive pulley 73 and an idler pulley 74. The egg roll dough 76 in long, relatively thin strips is positioned on the right end of the belt 71 by any suitable means. For example, the strips of egg roll dough may be formed by batch processing by rolling the dough and cutting it into strips of uniform width. When this procedure is followed, the end of one strip is positioned to overlap the rearward end of the preceding strip so that a continuous supply of dough 76 is positioned on the conveyor belt 71. Also the dough can be extruded onto the belt by a suitable extrusion press.

The belt 71 carries the dough to a filling position at 75 wherein egg roll filling is pumped at a controlled rate through a tube 78 onto the center of the dough 76. The belt 73 passes through a guide 79 which extends between 81 and 82. The guide is preferably formed of sheet stainless steel which is shaped to progressively raise the lateral edges of the belt as it enters the guide to shape the dough 76 around the filling 83 deposited on the dough at the filling location 75. Preferably, the filling location 75 is located beyond the forward end of the guide 79 so that the dough is shaped to a channel-shape before the filling 83 is applied.

The guide 79 progressively closes the belt and the dough 76 around the filling 83 as best illustrated in FIGURES 5, 6, and 7. At the location illustrated in FIGURE 5, the belt edges are raised to a generally curved channel-shape proportioned so that the edges 86 and 87 of the dough are above the filling and partially closed. At the position illustrated in FIGURE 6, one edge 88 of the belt and the adjacent edge 87 of the dough has beeen moved slightly past the center of the filling material 83 and the other edge 89 of the belt and the adjacent edge 86 of the dough extends upwardly and is spaced from the back side of the edge 88 of the belt. The guide is preferably formed with sections 90 which extend around the edges of the belt to insure its proper position.

As the belt passes the location illustrated in FIGURE 6, the guide causes the edge 88 of the belt to lift away from the adjacent edge 87 of the dough to a position clear of the edge 89 of the belt. When the location illustrated in FIGURE 7 is reached, the edge 86 of the dough overlaps the edge 87. In this position, the egg roll dough completely surrounds the filling 83 with the edges 86 and 87 overlapping. If the egg roll encasing dough 76 is sufficiently stiff, it will tend to remain in position as the belt progressively opens. To reduce any tendency of the dough to stick to the belts, the belt is supplied with an ample coating of flour or the like to facilitate the separation between the egg roll dough 76 and the belt. If the egg roll dough is not sufficiently stiff to retain its shape as the belt opens, the sections 90 are extended along the surface of the belt to act as scrapers to cause separation between the dough and the belt.

After the belt opens to expose the two overlying edges of the egg roll dough, the dough is carried past a final closing belt 91 positioned above the upper reach 72 and provided with a lower reach 92 which presses the two edges of the dough together to cause them to adhere to each other to complete the closing operation. If the pulleys 93 are journaled on sufficiently low friction bearings, it is not necessary to power the belt 91. However, if desired, one of the pulleys 93 can be powered to drive the closing belt 91 at substantially the same surface speed as the belt 71. The continuous length of egg roll leaving the closing belt 91 is subsequently cut into uniform length pieces of egg roll by a powered cutter 94 provided at the end of the belt 71 for this purpose.

In both of the illustrated embodiments of this invention, the labor of forming the food products involved is substantially eliminated so the manufacturing costs of the food product is minimized. Further, the automated depositing of the filling material is uniformly controlled so a uniform product is provided. Finally, the danger of contamination of the product is substantially reduced by the elimination of manual operations.

Although preferred embodiments of this invention are illustrated, it is to be understood that various modifications and rearrangements of parts may be resorted to without departing from the scope of the invention.

I claim:

1. A food processing machine for forming an edible article having an edible filling encased within an outer edible encasing material comprising powered conveyor means including a first belt having a horizontally extending and moving reach to transport said encasing material past a filling position with the upper surface of the encasing material open to receive said filling, filling supply means operable to deposit measured amounts of filling on said upper surface as it moves past said filling position, said conveyor means including guide means operable to raise the edges of said belt as said belt moves beyond said filling position so that the lateral sides of said encasing material are raised to a partially closed position around said filling, and second belt means positioned beyond said guide means operable to engage said encasing material and press it fully closed around said filling.

2. A food processing machine as set forth in claim 1 wherein said encasing material is separate pieces of bread, and said machine includes cutter means operable to automatically cut said pieces of bread into two halves joined at one edge and to automatically spread the two halves open on said first belt in position to be carried thereby past said filling position, and said second belt means presses the two halves back together around said filling.

3. A food processing machine as set forth in claim 2 wherein said pieces of bread are elongated loaves, said cutter means includes two opposed belts providing horizontally moving vertically extending reaches, and a rotating cutter blade positioned between said reaches, said reaches engaging opposite sides of said loaves to guide and feed said loaves past said cutter, and a deflector is provided formed with a forward edge aligned with said cutter blade between said reaches, said deflector including diverging walls extending from said edge to a location beyond said reaches, said walls being shaped to spread the two halves open on said first belt as the loaf passes said deflector.

4. A food processing machine as set forth in claim 3 wherein said filling supply means includes a nozzle at said filling position through which filling is pumped, and sensing means operable to cause flow of said filling material through said nozzle only when a loaf of bread is properly positioned to receive said filling material and to prevent flow of said filling material at other times.

5. A food processing machine as set forth in claim 4 wherein said sensing means includes two sensing switches, one of said switches initiating flow of filling material when the forward edge of a load reaches said nozzle, and the other of said switches terminating flow of said filling material before the rearward edge of a loaf reaches said nozzle.

6. A food processing machine as set forth in claim 4 wherein said bread is partially closed as it passes said guide means, and said second belt means includes opposed vertically extending horizontally moving reaches which engage the partially closed halves and press them together.

7. A food processing machine as set forth in claim 6 wherein said filling material is a soft spread, said nozzle is positioned to deposit filling material only on one of said halves, and a portion of said filling material costs the other half when said halves are pressed toegther by said second belt means.

8. A food processing machine as set forth in claim 1 wherein said encasing material is an elongated sheet, said guide means cause the edges of said encasing material to overlap, and said second belt means includes a horizontal reach opposite said first belt operable to engage the overlapping portions of said encasing material and press them together.

9. A food processing machine as set forth in claim 8 wherein said guide means form first belt to sequentially position the edges of said encasing material over said filling and then allows said belt to return to a substantially horizontal condition beyond said guide means.

10. A food processing machine as set forth in claim 9 wherein cutter means are provided to cut said encasing material and filling into uniform lengths after it passes said second belt means.

References Cited

UNITED STATES PATENTS

| | | |
|---|---|---|
| 1,777,830 | 10/1930 | Estrin. |
| 1,816,536 | 7/1931 | Joachimson. |
| 2,260,832 | 10/1941 | Deutscher. |
| 2,747,521 | 5/1956 | Gardner. |
| 3,115,103 | 12/1963 | Huss _____ 107—9 |

WALTER A. SCHEEL, Primary Examiner

R. I. SMITH, Assistant Examiner